United States Patent
Hayakawa

[11] Patent Number: 6,057,978
[45] Date of Patent: May 2, 2000

[54] DISK DRIVING DEVICE SELECTIVELY USING DELAYED STEP PULSES

[75] Inventor: Katsuyuki Hayakawa, Saitama-ken, Japan

[73] Assignee: Canon Denshi Kabushiki Kaisha, Saitama-ken, Japan

[21] Appl. No.: 08/579,023

[22] Filed: Dec. 18, 1995

Related U.S. Application Data

[63] Continuation of application No. 08/185,597, Jan. 24, 1994, abandoned.

[51] Int. Cl.[7] ............................................. G11B 5/55
[52] U.S. Cl. ................................. 360/78.13; 318/696
[58] Field of Search ............................... 318/696, 685; 360/77.02, 78.13, 78.14, 75

[56] References Cited

U.S. PATENT DOCUMENTS

| | | | |
|---|---|---|---|
| 4,489,259 | 12/1984 | White et al. | 360/77.02 X |
| 4,612,588 | 9/1986 | Tsukahara | 360/78.08 |
| 4,791,508 | 12/1988 | Augeri et al. | 360/75 |
| 4,855,660 | 8/1989 | Wright et al. | 360/78.13 X |
| 5,032,779 | 7/1991 | Takahashi | 360/78.13 X |
| 5,175,482 | 12/1992 | DeGuchi | 318/696 |
| 5,227,931 | 7/1993 | Misumi | 360/78.13 |

FOREIGN PATENT DOCUMENTS

| | | |
|---|---|---|
| 5-130799 | 5/1993 | Japan . |
| 6119729 | 4/1994 | Japan . |

*Primary Examiner*—W. R. Young
*Assistant Examiner*—James L Habermehl
*Attorney, Agent, or Firm*—Robin, Blecker & Daley

[57] ABSTRACT

A disk driving device is provided with a stepping motor arranged to move a head in units of a predetermined step with respect to a disk-shaped recording medium and a driving pulse generating circuit arranged to generate driving pulses for driving the stepping motor on the basis of a step pulse signal supplied from a host computer. The driving pulse generating circuit is arranged such that, the driving pulse generating circuit outputs, to the stepping motor, driving pulses obtained by delaying, by a predetermined length of time, step pulses occurring sequentially in the step pulse signal, if the step pulse signal is supplied at intervals of time less than a predetermined period of time, and outputs, to the stepping motor, driving pulses obtained without delaying the step pulse signal if the step pulse signal is supplied at intervals of time not less than the predetermined period of time.

19 Claims, 2 Drawing Sheets

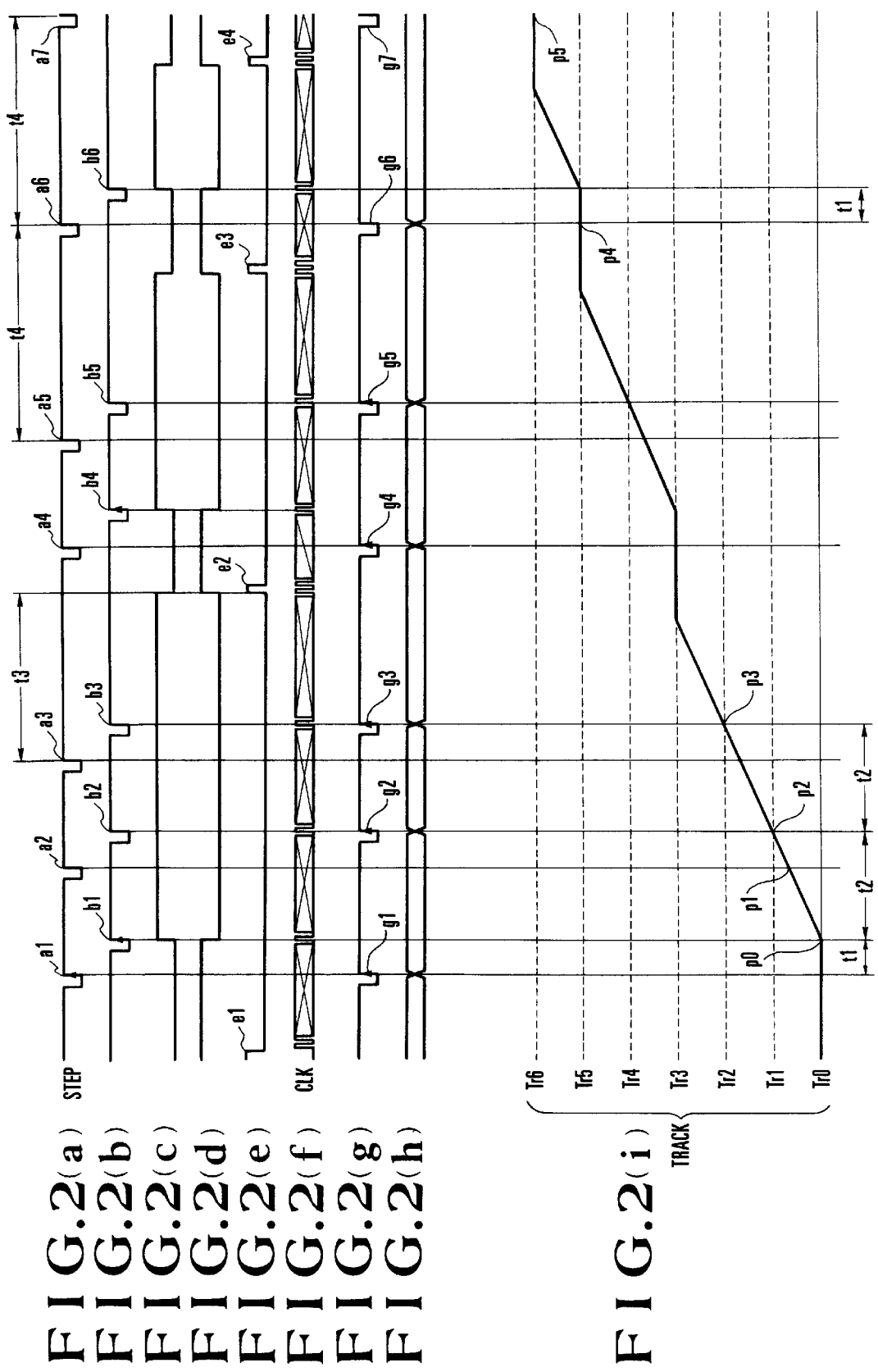

DISK DRIVING DEVICE SELECTIVELY USING DELAYED STEP PULSES

This is a continuation application under 37 CFR 1.62 of prior application Ser. No. 08/185,597, filed Jan. 24, 1994, now abandoned.

BACKGROUND OF THE INVENTION

1. Field of the Invention

This invention relates to a disk driving device and more particularly to a head feeding arrangement which is advantageous for the disk driving device.

2. Description of the Related Art

A stepping motor has heretofore been employed as a drive source for feeding a head in a disk driving device such as a floppy disk driving device. In performing a so-called seek action, the head is moved to a desired recording track on a disk by driving the stepping motor with driving pulses which are generated according to a step pulse signal supplied for moving the head from outside, for example, from a host computer or the like.

However, if the pulse interval, or a step rate, of the step pulse signal from the host computer becomes short, the stepping motor becomes incapable of following the step pulse signal any longer. In such a case, there arises an incident wherein the head fails to reach the desired track. Hereinafter this failure will be called a misseek. The misseek results from a build-up delay of the action of a mechanical part to be performed in response to the step pulse signal, due to static friction, inertia, mechanical backlash or play, etc., of a carriage on which the head is mounted, the stepping motor and a mechanism arranged to transmit the driving force of the stepping motor to the carriage.

During recent years, the disk driving device has become thinner in shape and compact in size. As a result, the size of the stepping motor also has become smaller. The driving force becomes smaller accordingly as the size of the stepping motor is reduced. The size of the mechanism for transmitting the driving force of the stepping motor to the carriage is also reduced for cost reduction. The reduction in size and cost has been disadvantageous in respect to accuracy and has brought about a tendency of increasing the build-up delay of the action mentioned above. The tendency becomes stronger depending on the environment particularly at a low ambient temperature. Further, in a case where the disk driving device is arranged to perform a driving action with a battery, the above-stated problem is apt to be brought about by a decrease in torque of the stepping motor resulting from a low voltage and battery consumption.

The above-stated misseek takes place sometimes for a step pulse signal of a step rate between 2.5 msec and 3 msec which is often adopted in manufactured products. The occurrence of such a misseek is undesirable with respect to reliability of recording or reproduction.

The reason why a build-up delay of the seek action causes a misseek in a case where the step rate is short is believed to be as follows. When the step pulse signal is supplied while the carriage, the stepping motor, etc., are quiescent, the stepping motor is not brought to an expected stable position by the excitation of the stepping motor driver in response to the first step pulse of the step pulse signal before a succeeding step pulse is supplied. In other words, the head has not been moved to a desired track when the succeeding step pulse is supplied. As a result, the excitation phase of the stepping motor driver is shifted by the succeeding, or second, step pulse while the stepping motor still remains in an unstable position. Under such a condition, the head cannot be moved to the desired track, thereby causing a misseek, because the torque of the stepping motor decreases to lower the speed of the head moving action, and the head is thus brought to a wrong place.

SUMMARY OF THE INVENTION

This invention is directed to the solution of the problem mentioned above. It is, therefore, a first object of this invention to provide a disk driving device which is capable of accurately following a step pulse signal supplied from a host computer.

It is a second object of this invention to provide a disk driving device which is capable of moving a head accurately to a desired track, without causing any misseek, even in the event of changes in the step rate of a step pulse signal supplied from a host computer.

It is a third object of this invention to provide a computer system which is capable of preventing occurrence of a misseek by enhancing the step pulse signal following occurrence thereof and by causing a head to reach a desired track without fail even if the pulse interval of a step pulse signal supplied becomes short.

To attain these objects, a disk driving device which is arranged as a preferred embodiment of this invention is provided with head driving means for moving a head in units of a predetermined step with respect to a disk-shaped recording medium, and driving pulse generating means for generating driving pulses for actuating the head driving means on the basis of an externally supplied step pulse signal, the driving pulse generating means being arranged to output, to the head driving means, driving pulses obtained by delaying the step pulse signal by a predetermined length of time, if the step pulse signal is supplied at intervals of time less than a predetermined period of time.

Further, to attain the objects, a disk driving device which is arranged as a preferred embodiment of this invention is provided with head driving means for moving a head in units of a predetermined step with respect to a disk-shaped recording medium, and driving pulse generating means for generating driving pulses for driving the head driving means on the basis of an externally supplied step pulse signal, the driving pulse generating means being arranged to output, to the head driving means, driving pulses obtained by delaying, by a predetermined length of time, step pulses occurring sequentially in the step pulse signal, if the step pulse signal is supplied at intervals of time less than a predetermined period of time, and to output, to the head driving means, driving pulses obtained without delaying the step pulse signal if the step pulse signal is supplied at intervals of time not less than the predetermined period of time.

Further, a preferred embodiment of this invention is a computer system which includes the above-stated disk drive device as a built-in part thereof.

It is a fourth object of this invention to provide a disk control integrated circuit which is arranged to perform the functions mentioned above.

These and other objects and features of this invention will become apparent from the following detailed description of an embodiment thereof taken in connection with the accompanying drawings.

BRIEF DESCRIPTION OF THE DRAWINGS

FIGS. 2(a) to 2(i) show a timing chart explaining the operation of the circuit shown in FIG. 1.

DETAILED DESCRIPTION OF THE PREFERRED EMBODIMENT

Figure 1:
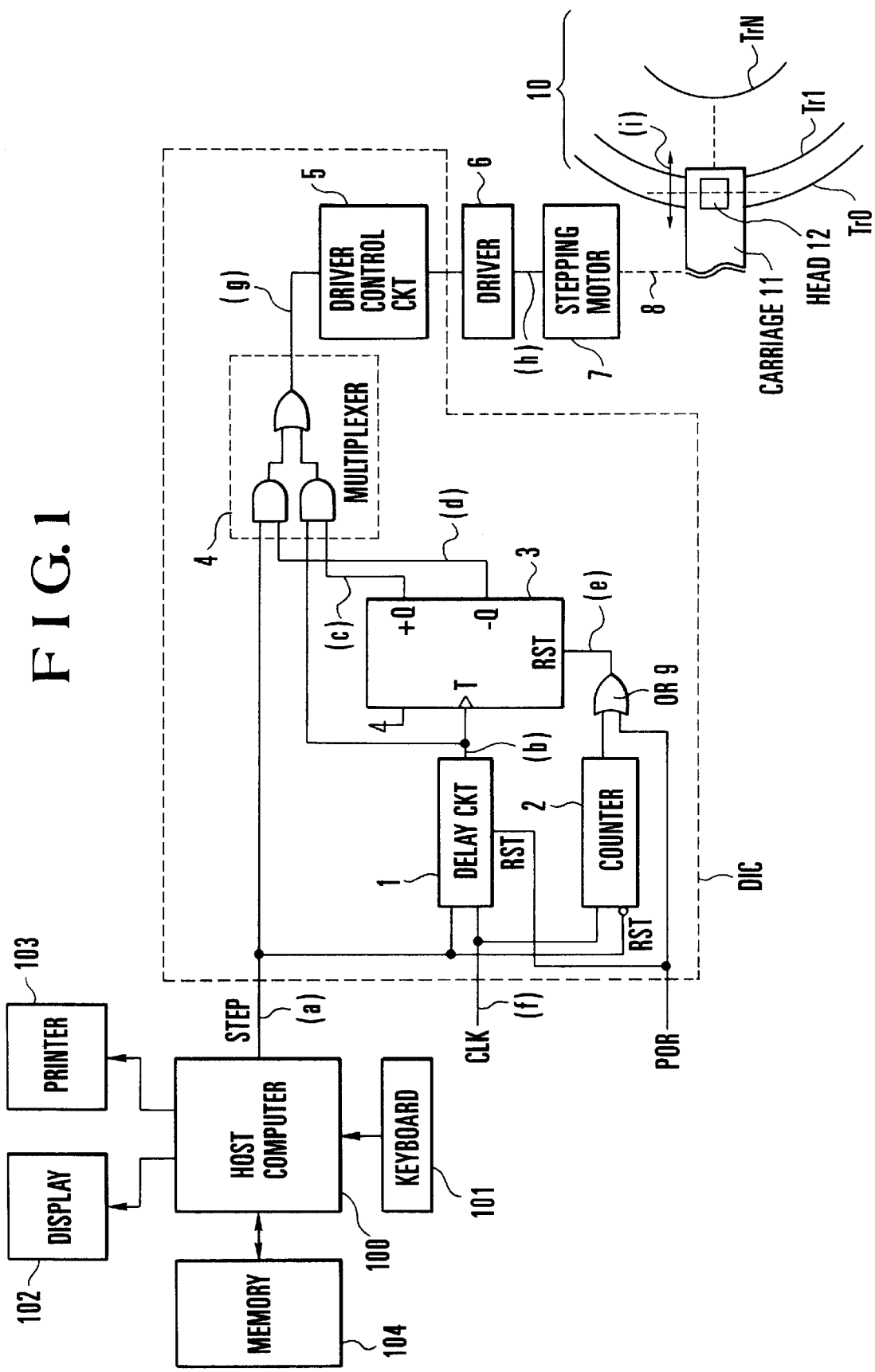
FIG. 1 is a block diagram showing the arrangement of the head driving control circuit of a disk driving device arranged according to this invention.

A disk driving device according to this invention is described in detail below through its embodiment with reference to the drawings, wherein FIG. 1 shows in a block diagram the arrangement of the disk driving device of this invention and FIGS. 2(a) to 2(i) show in a chart the timing of each of signals related to the head moving operation of the disk driving device.

Referring to FIG. 1, a microprocessor 100 is arranged as a host computer in a computer system in which the disk driving device of this invention is built or to which the disk driving device of this invention is connected. The arrangement includes a keyboard 101, a monitor display 102, a printer 103 and a memory 104 which consists of a ROM and a RAM. The arrangement of the disk driving device for driving a floppy disk or the like is composed of elements other than the elements 100 to 104. A circuit arrangement shown within a block DIC in FIG. 1 is unitized in an IC.

Referring to FIG. 1, a step pulse signal STEP for moving a head is supplied from the host computer 100 which is connected to the disk driving device. A clock pulse signal CLK is supplied from a clock oscillator (not shown) which is disposed within the disk driving device. A power-on-reset signal POR is supplied when a power supply is turned on.

A delay circuit 1 is arranged to receive the step pulse signal STEP which is supplied from the host computer 100 by a negative logic, in the case of this embodiment as shown in FIG. 2(a), and forms a delayed step pulse signal of negative logic by delaying the step pulse signal STEP by a predetermined length of time t1, as shown in FIG. 2(b). A counter 2 counts the pulses of the clock pulse signal CLK which is supplied from the clock oscillator, as shown in FIG. 2(f). The counter 2 is arranged to be reset by the low level of the step pulse signal STEP of FIG. 2(a), and to output a pulse of positive logic if the step pulse signal STEP of FIG. 2(a) is not supplied for a period of at least 5.5 msec (how to set this period of time will be described later herein). When the pulse of positive logic is outputted from the counter 2, a flip-flop 3 is reset through an OR circuit 9 at a timing point e2 as shown in FIG. 2(e).

The flip-flop 3 is arranged to be reset by the output of the OR circuit 9, as shown in FIG. 2(e). The +Q output of the flip-flop 3 is set at a high level, as shown in FIG. 2(c), and its −Q output at a low level, as shown in FIG. 2(d), by the rear edge of the delayed step pulse signal of FIG. 2(b) which is obtained by delaying the step pulse signal STEP of FIG. 2(a) by the predetermined length of time t1. A multiplexer 4 is arranged to selectively supply, as its output signal shown in FIG. 2(g), either the step pulse signal STEP of FIG. 2(a) or the delayed step pulse signal of FIG. 2(b) according to the output signals of the flip-flop 3 shown in FIG. 2(c) and FIG. 2(d). A driver control circuit 5 controls, on the basis of the step pulse signal of FIG. 2(g) which is supplied from the multiplexer 4, a driver 6 which is arranged to generate stepping motor driving pulses for driving a stepping motor 7.

A transmission mechanism 8 is arranged in a known manner to transmit the driving force of the stepping motor 7 to a carriage 11 on which a head 12 arranged to perform writing and reading is mounted. A disk-shaped recording medium 10 is subjected to a predetermined formatting. In FIG. 1, reference symbols Tr0, Tr1,-.-.-.-, TrN denote the positions of tracks formed on the recording medium 10. Reference symbol (i) denotes directions in which the head 12 mounted on the carriage 11 is to be moved. The track positions of the head 12 are also shown in FIG. 2(i).

The disk driving device of this invention which is arranged as described above operates as follows.

When a power supply is turned on on the side of the host computer which is connected to the disk driving device, the power supply of the disk driving device also turns on at the same time. The level of the power-on-reset signal POR become high to reset the delay circuit 1. The flip-flop 3 is also reset through the OR circuit 9, at the point of time e1 as shown in FIG. 2(e). As a result, the level of the output of the delay circuit 1 becomes high. The level of the +Q output of the flip-flop 3 becomes low and that of the −Q output of the flip-flop 3 high.

After completion of resetting, the level of the power-on-reset signal POR becomes low. The clock pulse signal CLK begins to oscillate. The delay circuit 1 and the counter 2 come to assume a standby state awaiting the arrival of the step pulse signal STEP of FIG. 2(a) from the host computer 100. The flip-flop 3 assumes a standby state awaiting the delayed step pulse signal of FIG. 2(b) from the delay circuit 1.

When the first step pulse, which is shown at a point a1 in FIG. 2(a), is supplied from the host computer 100, the multiplexer 4 selects and outputs to the driver control circuit 5 the step pulse a1 shown in FIG. 2(a), because the +Q and −Q outputs of the flip-flop 3 respectively remain at a low level and at a high level with the flip-flop 3 in its reset state, as shown in FIGS. 2(c) and 2(d). The driver control circuit 5 then outputs and supplies a driver driving signal to the driver 6. The driver 6 outputs a stepping motor excitation phase signal as shown in FIG. 2(h). The stepping motor 7 is driven by this signal.

The carriage 11 is driven through the driving force transmission mechanism 8. The head 12 begins to move to a desired track on the recording medium 10. While the movement of the head 12 is described herein to cover only its radially inward movement from the track Tr0 of the formatted recording medium for the sake of simplification of description, the embodiment is of course capable of moving the head 12 from any desired position on the recording medium in any direction without restrictions.

When the step pulse a1 is inputted, the inertia of the stepping motor 7, that of the carriage 11, the mechanical backlash or play of the transmission mechanism 8, etc., cause the head 12, i.e., the carriage 11, to actually begin to move after a delay time t1 at a point P0 as shown in FIG. 2(i). The delay time t1 of the delay circuit 1 is set at such a value that approximately corresponds to the build-up delay due to the inertia, backlash or play, etc., existing between the stepping motor 7 and the carriage 11.

As the first step pulse a1 is supplied from the host computer 100 to the delay circuit 1, a step pulse b1 is formed by delaying the first step pulse a1 by the length of time t1 as shown in FIG. 2(b). By the rear edge of the delayed step pulse b1, the +Q output of the flip-flop 3 is set at a high level, and the −Q output of the flip-flop 3 is set at a low level, so that the state of the multiplexer 4 changes from the state of selecting, as its output shown in FIG. 2(g), the step pulse signal STEP shown in FIG. 2(a) to a state of selecting the delayed step pulse signal outputted from the delay circuit 1 as shown in FIG. 2(b).

Meanwhile, the counter 2 is reset when each step pulse of the step pulse signal STEP of FIG. 2(a) is inputted to its reset terminal RST and begins to count the pulses of the clock pulse signal CLK. In a case where a next step pulse of the step pulse signal STEP of FIG. 2(a) is not inputted within a predetermined period of time t3, the output level of the counter 2 becomes high. (In the case of this embodiment, the period of time t3 is set at 5.5 msec. This value represents a period of time during which the stepping motor in the disk driving device is expected to be caused by the step pulse to move the head to a desired position and to come to a stop. This period of time is considered such that, the build-up delay t1 of the stepping motor takes place relative to the first step pulse coming from the host computer 100 after the lapse of the period of time t3. The period of time t3 varies with the disk driving device in use). With the output level of the counter 2 becoming high, the flip-flop 3 is reset through the OR circuit 9. As a result, the multiplexer 4 comes to resume the state of selecting the step pulse signal STEP of FIG. 2(a) which comes directly from the host computer 100 without passing through the delay circuit 1.

In a case where the pulse interval of the step pulse signal STEP supplied from the host computer 100 is so short that, after the first step pulse a1 is inputted, the second step pulse a2 of the step pulse signal STEP is inputted when the head 12 comes to a position P1 halfway in its movement from the track Tr0 to a next track Tr1, as shown in FIG. 2(i), i.e., at a point of time obtained when a period of time t2 has elapsed from the first step pulse a1, the head 12 fails to be caused to reach the desired track Tr1 by then as expected in response to the first step pulse a1, due to the delay time t1 of the start of the head moving action. Then, the stepping motor 7 assumes an unstable position and fails to reach a stable position relative to the excitation phase shown in FIG. 2(h).

Therefore, under such a condition, if the second step pulse a2 is supplied as it is while the head 12 is at the position P1, as in the case of the conventional disk driving device described in the foregoing, the stepping motor 7 does not adequately act and the head 12 might come to a stop before reaching the desired track position.

To solve this problem, the disk driving device according to this invention operates as follows. In a case where the second step pulse a2 is supplied by the timing of having the head 12 at the position P1 between the tracks Tr0 and Tr1, the interval t2 between the step pulses a1 and a2 supplied from the host computer 100 is less than 5.5 msec. At that point of time, therefore, the flip-flop 3 has not been reset, and a delayed step pulse b2 which is obtained by delaying the step pulse a2 by the length of time t1 is outputted from the multiplexer 4 as its output (g), as indicated by a pulse g2 in FIG. 2(g).

The pulse g2 outputted from the multiplexer 4 is delayed as much as the length of time t1 corresponding to the action delay time of the head 12 from the second step pulse a2 as mentioned above. By the time the pulse g2 is outputted, therefore, the head 12 has reached a position P2 at the track Tr1. Both the stepping motor 7 and the head 12 have reached their desired track positions by then as expected to be moved in response to the first step pulse a1.

Therefore, the output of the driver control circuit 5 is varied by the pulse g2. The stepping motor 7 then drives the head 12 according to the excitation phase output (h) of the driver 6. The head 12 is thus moved from the track Tr1 to the track Tr2. At the position P2, the stepping motor 7, the driving force transmission mechanism 8 and the carriage 11 are at their desired positions and in their operating states. Therefore, without the delay for the length of time t1, the head 12 can be smoothly moved to the track Tr2, and the operation can be also smoothly performed for a next pulse g3 which is based on the third delayed step pulse b3.

In a case where the interval between the third step pulse a3 and a next step pulse a4 is more than 5.5 msec as shown in FIG. 2(a), that is, if no step pulse is inputted from the host computer 100 for a certain period of time, the head 12 has already been moved to the track Tr3 as expected from the step pulse a3. Further, in this case, the stepping motor 7, the carriage 11 and the driving force transmission mechanism 8 might be already at rest after having finished their actions. In view of this, as shown in FIG. 2(e), the flip-flop 3 is reset by the signal e2 outputted from the counter 2 by counting 5.5 msec. Then, the step pulses beginning with the fourth step pulse a4 shown in FIG. 2(a) begin to be processed in the same manner as the first step pulse a1. The step pulse a4 is supplied as it is to the driver control circuit 5, as a pulse g4, without delaying it. For the fifth step pulse a5 which is inputted a period of time t2 after the step pulse a4, a delayed step pulse b5 is supplied to the driver control circuit 5 as a pulse g5.

Further, if an interval t4 between the fifth step pulse a5 and the sixth step pulse a6 and an interval t4 between the sixth step pulse a6 and the seventh step pulse a7 are more than 5.5 msec, that is, if a state of receiving no step pulse from the host computer 100 for a certain period of time continues, the flip-flop 3 is reset by the output e3 of the counter 2, shown in FIG. 2(e), after the lapse of 5.5 msec from the step pulse a5. Then, the sixth step pulse a6 is supplied, without delaying it in the same manner as the first step pulse a1, to the driver control circuit 5 as a pulse g6. For the seventh step pulse a7, a pulse g7 is supplied to the driver control circuit 5 in exactly the same manner as the step pulse a6.

The stepping motor 7 and the head 12 then act as follows. By the time when the pulse g6 is supplied to the driver control circuit 5, the stepping motor 7 and the head 12 have already reached a position P4 (for the track Tr5) expected to be attained in response to the step pulse a5, i.e., the pulse g5. They might be quiescent by then.

In this instance, the action to be performed in response to the pulse g6 begins at the end of the delay time t1. The pulse g7 is supplied to the driver control circuit 5 after the lapse of an interval which is at least 5.5 msec. This time interval is sufficiently long for allowing the head to reach a track position P5 (at the track Tr6) to which the head 12 is expected to be moved in response to the step pulse a6, i.e., the pulse g6. The step pulse a7, therefore, does not have to be delayed and is outputted without delay as the pulse g7.

As described above, in a case where the step pulse signal from the host computer 100 continues at intervals of time longer than a certain period of time, each of the step pulses is outputted as the first step pulse, without delaying it, to the driver control circuit 5.

In accordance with the method described above, in a case where the head is quiescent or nearly quiescent with no step pulse inputted for a period of time longer than a predetermined period of time, a seek action can be accurately accomplished without a drop in the operating speed of the stepping motor, or movement to a wrong position, which otherwise results from the fact that the stepping motor and the head fail to reach their positions to which they are expected to have been moved in response to the first step pulse when the second step pulse is inputted, due to a delay time after the stepping motor is driven and before commencement of the action of the carriage on which the head is mounted.

The embodiment described above is arranged in such a manner that, in a case where the step pulse signal is supplied from the host computer at intervals of time less than a predetermined period of time, a delayed pulse signal is formed by delaying a second and subsequently occurring step pulses as much as a delay time required before commencement of action after the stepping motor is driven. It is possible to set the delay time for each of the step pulses to be delayed by individually obtaining a difference in time between the input of the second step pulse from the host computer and arrival of the head at a position to which the head is expected to be moved in response to the first step pulse. This method permits smoother execution of a seek action as the supply of the delayed step pulses enables the stepping motor and the head to always reach their positions expected to be reached in response to a preceding step pulse even if the pulse interval of the pulse signal happens to vary.

Further, the circuit DIC in this embodiment which consists of the delay circuit 1, the counter 2, the flip-flop 3, the multiplexer 4, etc., as shown in FIG. 1, is formed together with other circuits into a one-chip IC as a disk driving control IC.

As described above, the embodiment is capable of smoothly moving the head by solving the problem that the delayed start of a stepwise driving action due to inertia, static friction and backlash or play of the stepping motor, the carriage and the transmission mechanism brings the stepping motor into an unstable state to prevent the head from reaching a desired track in response to the input of a step pulse. Unlike the conventional device, the embodiment never brings about such an inconvenience that, after the first or initial step pulse is supplied for driving the stepping motor, a successor step pulse is supplied before the end of the period of time of a mechanical delay caused by the backlash or play of the transmission mechanism, etc., to prevent driving to a desired track. The arrangement of the embodiment thus enables the head moving control to be always accurately, reliably and smoothly carried out even in a case where the pulse interval of the step pulse signal becomes short.

What is claimed is:

1. A disk driving device comprising:
  a) head driving means for moving a head in units of a predetermined step with respect to a disk-shaped recording medium, said head driving means including a stepping motor;
  b) driving pulse generating means for generating driving pulses for actuating said head driving means on the basis of an externally supplied step pulse signal comprising a plurality of pulses,
  wherein said driving pulse generating means is arranged to input to said head driving means at least one driving pulse obtained by delaying a pulse of the step pulse signal by a predetermined length of time less than a predetermined period of time, if pulses of the step pulse signal are supplied at intervals of time less than a predetermined period of time,
  wherein the externally supplied step pulse signal is supplied by a computer device to which said disk driving device is connected, and wherein said driving pulse generating means is arranged also to generate driving pulses corresponding to pulses of the step pulse signal and to input the so generated driving pulses to said head driving means and said driving pulse generating means is arranged to selectively input to said head driving means, according to intervals of pulses in the step pulse signal, either driving pulses obtained without delaying pulses of the step pulse signal or driving pulses obtained by delaying pulses of the step pulse signal by the predetermined length of time.

2. A device according to claim 1, wherein said driving pulse generating means is arranged to input to said head driving means driving pulses obtained by delaying, by the predetermined length of time, pulses occurring sequentially in the step pulse signal if pulses of the step pulse signal are supplied at intervals of time less than the predetermined period of time.

3. A device according to claim 2, wherein said head is mounted on a head carriage which is movable in a radial direction of the disk-shaped recording medium and is arranged to be driven by said stepping motor, and wherein the predetermined length of time to be used for delaying corresponds to a length of time of a delay resulting from at least one of inertia, backlash and play existing within a part of the disk driving device extending from said stepping motor through said carriage.

4. A device according to claim 2, wherein the predetermined period of time corresponds to a length of time necessary for said head comes to a quiescent state after a pulse in said step pulse signal causes the head to move from a track at which the head is currently located to an adjacent track on the disk-shaped recording medium.

5. A device according to claim 2, wherein said driving pulse generating means includes a delay circuit for delaying said at least one pulse of the step pulse signal, a counter for deciding whether or not a pulse interval of the step pulse signal is less than the predetermined period of time, and a multiplexer arranged to selectively perform switching, according to an output of said counter, between a driving pulse obtained without delaying a pulse of the step pulse signal and a driving pulse obtained through said delay circuit by delaying a pulse of the step pulse signal by the predetermined length of time.

6. A disk driving device comprising:
  a) head driving means for moving a head in units of a predetermined step with respect to a disk-shaped recording medium; and
  b) driving pulse generating means for generating driving pulses for actuating said head driving means on the basis of an externally supplied step pulse signal comprising a plurality of pulses,
  wherein said driving pulse generating means is arranged to input to said head driving means driving pulses obtained by delaying, by a predetermined length of time, step pulses occurring sequentially in the step pulse signal, if pulses of the step pulse signal are supplied at intervals of time less than a predetermined period of time, and to input to said head driving means driving pulses obtained without delaying pulses in the step pulse signal if pulses of the step pulse signal are supplied at intervals of time not less than the predetermined period of time.

7. A device according to claim 6, wherein said head driving means includes a stepping motor.

8. A device according to claim 7, wherein the externally supplied step pulse signal is is supplied by a computer device to which said disk driving device is connected, and wherein said driving pulse generating means is arranged also to generate undelayed driving pulses in accordance with the step pulse signal.

9. A device according to claim 7, wherein said head is mounted on a head carriage which is movable in a radial direction of the disk-shaped recording medium and is arranged to be driven by said stepping motor, and wherein the predetermined length of time to be used for delaying corresponds to a length of time of a delay resulting from at least one of inertia, backlash and play existing within a part of the disk driving device extending from said stepping motor through said carriage.

10. A device according to claim 7, wherein the predetermined period of time corresponds to a length of time necessary for said head comes to a quiescent state after a pulse in said step pulse signal causes the head to move from a track at which the head is currently located to an adjacent track on the disk-shaped recording medium.

11. A device according to claim 7, wherein said driving pulse generating means includes a delay circuit for delaying pulses of the step pulse signal, a counter for deciding whether or not a pulse interval of the step pulse signal is less than the predetermined period of time, and a multiplexer arranged to selectively perform switching, according to an output of said counter, between a driving pulse obtained without delaying a pulse of the step pulse signal and a driving pulse obtained through said delay circuit by delaying a pulse of the step pulse signal by the predetermined length of time.

12. A computer system comprising:
   a) a host computer;
   b) head driving means for moving a head in units of a predetermined step with respect to a disk-shaped recording medium; and
   c) driving pulse generating means for generating driving pulses for actuating said head driving means on the basis of a step pulse signal supplied from said host computer and comprising a plurality of pulses,
   wherein said driving pulse generating means is arranged to input to said head driving means driving pulses obtained by delaying, by a predetermined length of time, pulses occurring sequentially in the step pulse signal, if pulses of the step pulse signal are supplied at intervals of time less than a predetermined period of time, and to input to said head driving means driving pulses obtained without delaying pulses of the step pulse signal if pulses of the step pulse signal are supplied at intervals of time not less than the predetermined period of time.

13. A system according to claim 12, wherein said head driving means includes a stepping motor.

14. A system according to claim 13, wherein said head is mounted on a head carriage which is movable in a radial direction of the disk-shaped recording medium and is arranged to be driven by said stepping motor, the predetermined length of time to be used for delaying corresponds to a length of time of a delay resulting from at least one of inertia, backlash and play existing within a part extending from said stepping motor through said carriage, and the predetermined period of time corresponds to a length of time necessary for said head comes to a quiescent state after a pulse in said step pulse signal causes the head to move from a track at which the head is currently located to an adjacent track on the disk-shaped recording medium.

15. A system according to claim 13, wherein said driving pulse generating means includes a delay circuit for delaying pulses in the step pulse signal, a counter for deciding whether or not a pulse interval of the step pulse signal is less than the predetermined period of time, and a multiplexer arranged to selectively perform switching, according to an output of said counter, between a driving pulse obtained without delaying a pulse of the step pulse signal and a driving pulse obtained through said delay circuit by delaying a pulse of the step pulse signal by the predetermined length of time.

16. A head drive control integrated circuit comprising:
   a) head driving means for moving a head in units of a predetermined step with respect to a disk-shaped recording medium, said head driving means is arranged to drive a stepping motor; and
   b) driving pulse generating means for generating driving pulses for actuating said head driving means on the basis of an externally supplied step pulse signal comprising a plurality of pulses,
   wherein said driving pulse generating means is arranged to input to said head driving means driving pulses obtained by delaying, by a predetermined length of time, pulses occurring sequentially in the step pulse signal if pulses of the step pulse signal are supplied at intervals of time less than a predetermined period of time,
   wherein the externally supplied step pulse signal is supplied by a computer device to which said integrated circuit is connected, and wherein said driving pulse generating means is arranged also to generate driving pulses corresponding to pulses of the step pulse signal and to input the so generated driving pulses to said head driving means and said driving pulse generating means is arranged to selectively input to said head driving means, according to a pulse interval of the step pulse signal, either driving pulses obtained without delaying pulses of the step pulse signal or driving pulses obtained by delaying pulses of the step pulse signal and, if pulses of the step pulse signal are supplied at intervals of time less than the predetermined period of time, said driving pulse generating means inputs to said head driving means driving pulses obtained by delaying pulses occurring sequentially in the step pulse signal by the predetermined length of time.

17. An integrated circuit according to claim 16, wherein said head is mounted on a head carriage which is movable in a radial direction of the disk-shaped recording medium and is arranged to be driven by said stepping motor, the predetermined length of time to be used for delaying corresponds to a length of time of a delay resulting from at least one of inertia, backlash and play existing within a part extending from said stepping motor through said carriage, and the predetermined period of time corresponds to a length of time necessary for said head comes to a quiescent state after a pulse in said step pulse signal causes the head to move from a track at which the head is currently located to an adjacent track on the disk-shaped recording medium.

18. An integrated circuit according to claim 17, wherein said driving pulse generating means includes a delay circuit for delaying pulses of the step pulse signal, a counter for deciding whether or not a pulse interval of the step pulse signal is less than the predetermined period of time, and a multiplexer arranged to selectively perform switching, according to an output of said counter, between a driving pulse obtained without delaying a pulse of the step pulse signal and a driving pulse obtained through said delay circuit by delaying a pulse of the step pulse signal by the predetermined length of time.

19. A disk driving device operably responsive to an input step pulse signal comprising a plurality of pulses, said device comprising:
   a) head driving means for moving a head responsively to driving pulses input thereto; and
   b) control means for receiving said input step pulse signal and for generating said driving pulses, said control means including first circuit means operable for directly inputting said pulses of said input step pulse signal to said head driving means, second circuit means operable for delaying said pulses of said input step pulse signal and for inputting said delayed pulses to said head driving means, third circuit means for detecting pulse intervals of said input pulse signal, fourth circuit means responsive to detection by said third circuit means for selectively operating said first and second circuit means and delay circuit means for receiving said pulses of said input step pulse signal, said delay circuit means having a delay corresponding to a length of time of a delay resulting from at least one of inertia, backlash and play existing within said head driving means.

\* \* \* \* \*